E. HIXON & C. J. STAUBER.
WATER METER.
APPLICATION FILED JUNE 26, 1912.
1,070,470.
Patented Aug. 19, 1913.
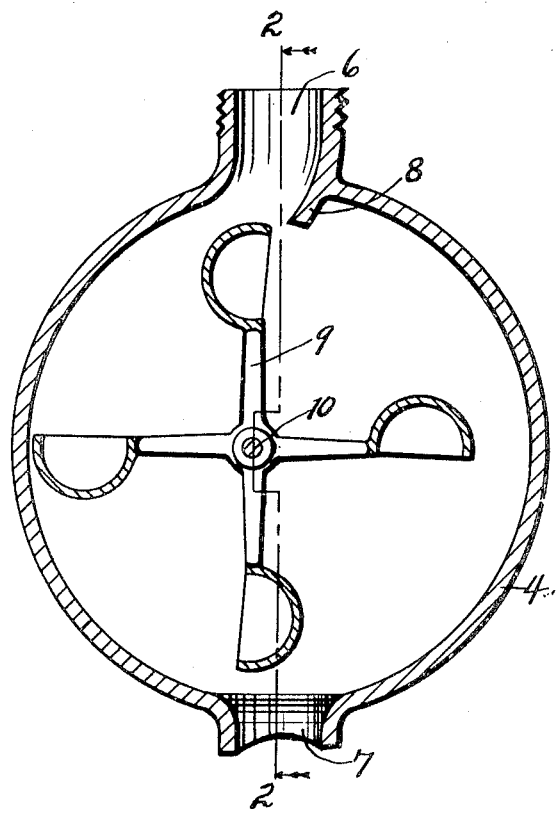
Witnesses:
Thomas Colson
C. E. Wessels
Inventors
Edward Hixon,
Charles J. Stauber,
By Joshua R. H. Potts
his Attorney.

UNITED STATES PATENT OFFICE.

EDWARD HIXON AND CHARLES J. STAUBER, OF CHICAGO, ILLINOIS, ASSIGNORS TO HIXON AUTOMATIC VALVE COMPANY, OF CHICAGO, ILLINOIS, A CORPORATION OF ILLINOIS.

WATER-METER.

1,070,470.  Specification of Letters Patent.  Patented Aug. 19, 1913.

Application filed June 26, 1912. Serial No. 705,946.

*To all whom it may concern:*

Be it known that we, EDWARD HIXON and CHARLES J. STAUBER, citizens of the United States, and residents of the city of Chicago, county of Cook, and State of Illinois, have invented certain new and useful Improvements in Water-Meters, of which the following is a specification.

Our invention relates to water meters and particularly to the class which will automatically measure a quantity of liquid and then shut itself off automatically.

The object of this improvement is to provide a device of the character mentioned which will be simple of construction and efficient in operation.

The invention consists in the combinations and arrangements of parts hereinafter described and claimed.

The invention will be best understood by reference to the accompanying drawing forming a part of this specification, and in which, Figure 1 is a vertical section of the measuring wheel chamber of our device, Fig. 2 is a vertical section of the same taken on substantially line 2—2 in Fig. 3, and Fig. 3 is a fragmental elevation of the device.

The preferred form of construction as illustrated in the drawing comprises a measuring wheel chamber 4 having a removable lid 5 secured thereto to form a liquid tight joint and provided with an intake opening 6, exhaust opening 7 and a deflecting blade 8. Deflecting blade 8 is positioned to direct the liquid entering through the opening 6 so as to engage the buckets of the liquid measuring wheel 9. The wheel 9 is secured on a shaft 10 and said shaft is journaled in suitable bearings eccentrically with the central portion of the measuring wheel chamber 4 so that the buckets on said wheel will pass near the side of the measuring wheel chamber passing downwardly and at a distance from the side of said chamber when passing upwardly so that there will be little or no friction on the upward moving side of said wheel. A shaft 11 is journaled in the central portion of the plate 12 which is removably secured to the measuring wheel chamber 4. Said shaft is operatively connected with the measuring wheel 9 by means of a train of gears 13, 14, 15, 16, 17 and 18 to cause said shaft to rotate with the measuring wheel 9 in a proportion of about one to one thousand, or any other desired proportion.

Secured on the shaft 11 in proximity with the casing 12 is a clutch member 19 and in proximity therewith but mounted loosely on the shaft 11 is a sleeve 20 having a clutch end adapted to fit the clutch member 19. The sleeve 20 is provided with a manually operative thumb wheel 21 to provide means for manually rotating the sleeve 20 on the shaft 11 independently of the clutch member 19. Said sleeve 19 is held resiliently against the clutch member 19 by means of a compression spring 22 between the thumb wheel 21 and a nut 23.

On the surface of the casing 12 is formed a dial 24 having markings corresponding to the amount of liquid which will pass through the device. Carried by the sleeve 20 is a pointer 25 coöperating with the dial 24 to indicate the amount of liquid passing through the device. A suitable valve or spigot 26 having a shaft 27 and operating lever 28 is secured to a liquid supply and the intake opening of the device in a manner to permit liquid to pass into the device upon opening such valve. Operatively connected with the lever 28 is a connecting rod 29 which is provided with a looped end 30. Said looped end 30 is slidably mounted on the sleeve 20 between the thumb nut 21 and a cam 31. Cam 31 is carried on the sleeve 20 and adapted to engage a cam roller 32 to raise the connecting rod 29 thereby closing the valve 26 to shut off the liquid supply.

When it is desired to draw a certain quantity of liquid the pointer is set at a point on the dial corresponding with the quantity of liquid it is desired to draw, as for instance, set at 15, Fig. 3 and the valve 26 opened, the liquid will pass through said valve and turn the measuring wheel 9 until the cam 31 and pointer 25 reach the position indicated in Figs. 2 and 3, at zero at which time the cam 31 will have engaged the cam roller 32 thereby raising the connecting rod 29, closing off the valve 26 to stop the passage of liquid into the device. In a like manner the pointer 25 and cam 31 on the shaft 11 may be set to draw any desirable quantity of liquid and as soon as the desired amount has passed through the device the pointer and cam will reach the zero point and automatically stop the flow of liquid through the device as described.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. In combination, a housing inclosing a measuring wheel chamber; a measuring wheel journaled in said housing; a shaft journaled in said housing and operatively connected with said measuring wheel; a cam wheel journaled on said shaft; spring actuated clutch gears operatively connecting said shaft with said cam wheel; a controlling valve in communication with said measuring wheel chamber; and means actuated by said cam wheel closing said valve.

2. A liquid meter comprising a measuring wheel chamber; a measuring wheel journaled eccentrically in said measuring wheel chamber; an indicating dial on said measuring wheel chamber; a shaft journaled through said indicating dial; a train of gears connecting said shaft with said measuring wheel; a pointer rotatively mounted on said shaft; a spring actuated clutch gear connecting said pointer with said shaft; a cam on said clutch gear; a valve communicating with said measuring wheel chamber; and means actuated by said cam for automatically closing said valve, substantially as described.

3. A liquid meter comprising a measuring wheel chamber; a measuring wheel journaled eccentrically in said measuring wheel chamber; an indicating dial on said measuring wheel chamber; a shaft journaled through said indicating dial; a train of gears connecting said shaft with said measuring wheel; a clutch member rigidly secured on said shaft; a sleeve provided with a clutching end to coöperate with said clutch member and loosely mounted on said shaft; a pointer carried on said sleeve; a manually operative hand wheel on said sleeve; a compression spring resiliently maintaining the clutch end of said sleeve in mesh with said clutch member; a valve communicating with said measuring wheel chamber; and means on said sleeve communicating with said valve to automatically close said valve, substantially as described.

4. A liquid meter comprising a measuring wheel chamber; a measuring wheel journaled eccentrically in said measuring wheel chamber; an indicating dial on said measuring wheel chamber; a shaft journaled through said indicating dial; a train of gears connecting said shaft with said measuring wheel; a clutch member rigidly secured on said shaft; a sleeve provided with a clutching end to coöperate with said clutch member and loosely mounted on said shaft; a pointer carried on said sleeve; a manually operative hand wheel on said sleeve; a compression spring resiliently maintaining the clutch end of said sleeve in mesh with said clutch member; a valve communicating with said measuring wheel chamber; a cam on said sleeve; a connecting rod operatively connected with said valve at one of its ends and provided with a loop at its other end slidably mounted on said sleeve; and a member on said connecting link to engage said cam to automatically close said valve, substantially as described.

In testimony whereof we have signed our names to this specification in the presence of two subscribing witnesses.

EDWARD HIXON.
CHARLES J. STAUBER.

Witnesses:
ARTHUR A. OLSON,
JOSHUA R. H. POTTS.